Oct. 9, 1951  F. J. HENKEL  2,570,444
INDEXING DEVICE FOR MACHINE TOOLS
Filed Dec. 12, 1945  2 Sheets-Sheet 2

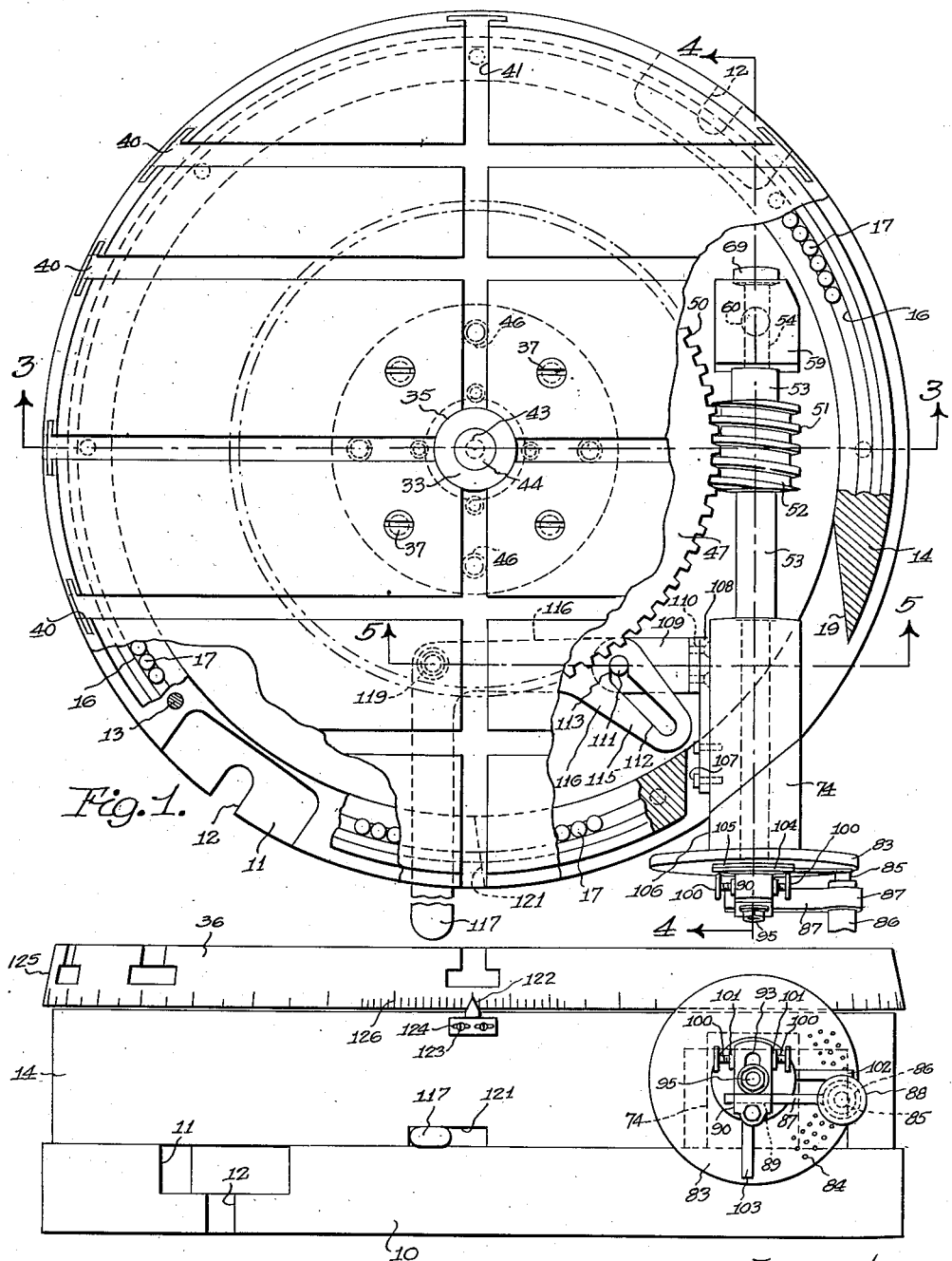

Inventor
Ferdinand J. Henkel
By Barthel + Bugbee
Att'ys

Patented Oct. 9, 1951

2,570,444

UNITED STATES PATENT OFFICE 2,570,444

INDEXING DEVICE FOR MACHINE TOOLS

Ferdinand J. Henkel, Royal Oak, Mich., assignor to Lamina Dies and Tools, Inc., Berkley, Mich., a corporation of Michigan Application December 12, 1945, Serial No. 634,491

2 Claims. (Cl. 90—57)

This invention relates to machine tools and in particular, to indexing devices for use with machine tools.

One object of this invention is to provide an indexing device for machine tools capable of being rapidly yet accurately shifted from one station to another in a series of stations, yet accurately indexed by a fine adjustment at each station, for performing operations which are repeated at each station.

Another object is to provide an indexing device for machine tools capable of being shifted rapidly from station to station around its periphery by a manually operated mechanism, yet with the assurance that at each station the fine indexing mechanism will automatically and accurately fall into mesh at its intended location, with a micrometric fine adjustment for performing the indexing operation at each station.

Another object is to provide an indexing device for machine tools comprising a turntable rotated by a worm on a swinging worm shaft carrying an indexing head and having quick engagement and disengagement mechanism whereby to throw the worm in and out of mesh so that the turntable may be turned manually from one station to another yet with the assurance that the worm will be re-engaged accurately without further adjustment, thereby avoiding the slow operation of cranking the indexing device by hand from station to station.

Other objects and advantages of the invention will become apparent during the course of the following description of the accompanying drawings, wherein:

Figure 1 is a top plan view of the indexing device according to a preferred embodiment of the invention, partly broken away to disclose the mechanism more clearly;

Figure 2 is a front elevation of the indexing device shown in Figure 1;

Figure 3:
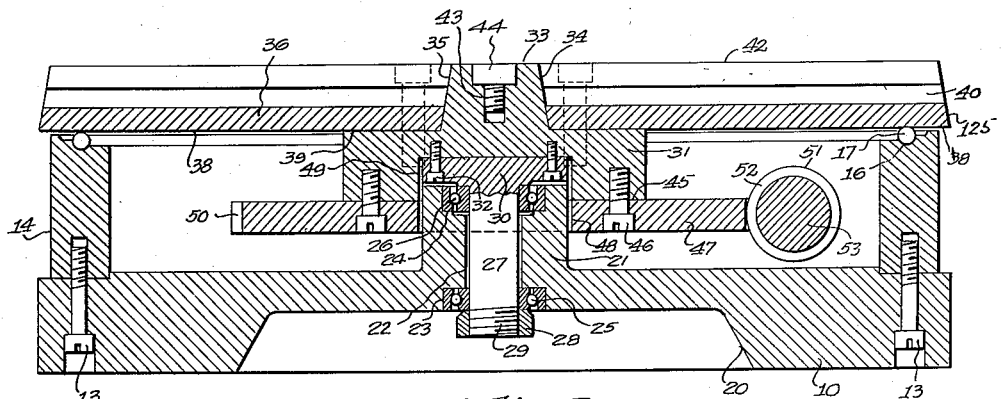
Figure 3 is a central cross-section along the line 3—3 in Figure 1.
Figure 4:
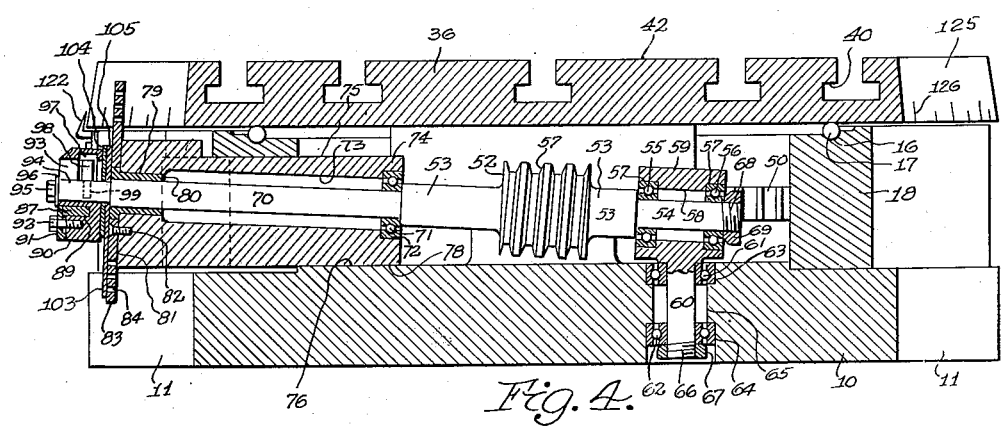
Figure 4 is a longitudinal section along the worm shaft taken along the line 4—4 in Figure 1.

Referring to the drawings in detail, Figures 1 and 3 show a preferred embodiment of the indexing device of this invention as mounted on a base plate 10 of circular shape having recesses 11 with notches 12 therein disposed at intervals around the periphery for the purpose of inserting clamping bolts whereby the device is secured to the bed of a machine tool, such as a milling machine. Secured to the base plate 10, as by the set screws 13 is a cylindrical housing 14 having a stepped top edge within which is an annular groove 16 for the reception of anti-friction bearing balls 17. The cylindrical housing 14 at the location adjacent the recesses 11 is provided with a recessed portion 18 (Figure 4) to provide space for manipulating a wrench in order to adjust the clamping bolts. The cylindrical housing 14 is also provided with an approximately tangential passageway 19 for the passage of a portion of the indexing mechanism hereinafter described.

The base plate 10 is provided with a central recess 20 (Figure 3) therebeneath, and a central boss 21 rising therefrom and having a central bore 22 with annular recesses 23 and 24 at the top and bottom thereof. Mounted in the recesses 23 and 24 are antifriction bearing units 25 and 26, ball-bearing assemblies being shown. Rotatably mounted in the anti-friction bearing units 25 and 26 within the bore 22 is a vertical shaft 27 having a retaining nut 28 threaded upon the lower end 29 thereof.

The upper end of the shaft 27 is enlarged to provide a head 30 to which is secured a hub 31, as by the set screws 32. The hub 31 is provided at its upper portion with a central conical boss 33 with a tapered outer surface 34 forming, in effect, a tapered shaft of relatively large diameter in proportion to its length. Mounted on the tapered surface 34 and having a correspondingly conical mating bore 35 is a turntable 36. The latter is secured by the set screws 37 (Figure 1) to the hub 31 and its undersurface 38 at its central portion rests upon the top surface 39 of the hub 31. Near its periphery, the bottom surface 38 of the turntable 36 rests upon the bearing balls 17. The turntable 36 is provided with transverse T-slots 40 and 41 (Figures 1 and 4) for the insertion of clamping bolts for the securing of work pieces upon the upper surface 42 of the turntable 36. The boss 33 is centrally provided with a countersunk threaded bore 43 for the reception of a screw plug 44.

Secured to the lower surface 45 of the boss 31, as by the set screws 46, is a worm wheel 47 having a central bore 48 co-extensive with a bore 49 in the underside of the hub 31, yet of sufficient diameter to provide a clearance between it and the adjacent surfaces of the boss 21 and head 30.

The worm wheel 47 is provided with peripheral teeth 50 directed substantially to the axis of the shaft 27. Meshing with the teeth 50 are the teeth 51 of a worm 52 forming a part of a worm shaft 53 (Figure 4), the inner end 54 of which is of reduced diameter and rotatably mounted in anti-friction bearings 55 and 56 disposed in annular recesses 57 at opposite ends of a bore 58 in a head or swivel bearing 59 on the top of a vertical shaft 60. The bore 58 and the axis of rotation of the shaft 53 are at an angle to the axis of rotation of the shaft 60 such that the worm teeth 51 will mesh with the worm wheel teeth 50 when the latter are vertical. The axis of rotation of the worm shaft 53 is therefore tilted at the pitch angle of the worm 52. The shaft 60 is rotatably mounted in anti-friction bearings 61 and 62 mounted in annular recesses 63 and 64 located at the top and bottom of a bore 65 in the base plate 10. The lower end 66 of the shaft 60 is threaded to receive a retaining nut 67. Similarly, the inner end 68 of the worm shaft 53 is threaded to receive a retaining nut 69. Outwardly of the worm 52, the worm shaft 53 is provided with a reduced diameter portion 70 rotatably mounted in anti-friction bearings 71 seated in an annular recess 72 at the inner end of an elongated cavity 73 in a block 74, the top and bottom 75 and 76 of which (Figure 5) slidably engage the opposed parallel surfaces 77 and 78 of the housing 14 and base plate 10, the surfaces 77 and 78 forming guideways for the horizontal swinging of the block 74 around the vertical axis of the shaft 60. The block 74 is slidable to and fro between the opposite sides of the passageway 19 (Figure 1) in the cylindrical housing 14.

At the outer end of the block 74, the cavity 73 terminates in a bore 79 in which is mounted a sleeve 80 serving as a bearing for the outer end of the reduced diameter portion 70 of the worm shaft 53. Mounted on the forward end 81 of the block 74 and secured thereto as by the set screws 82, is an indexing dial 83 surrounding the outer end of the bearing sleeve 80. The indexing dial 83 is provided with the usual rows of holes 84 which are engaged by the small end of a pin 85 (Figure 1) reciprocably mounted in a boss 86 on the end of an indexing arm 87 and having a head 88 (Figure 2) connected to the pin 85 so as to reciprocate the latter and insert or withdraw its small end from the holes 84.

The arm 87 is slidably mounted in a guide groove 89 (Figure 4) in a block 90 and held in any adjusted position by a pressure plate 91 which is engaged by a clamping screw 92 threaded into the block 90. The block 90 is provided with an elongated slot 93 of sufficient width for its side walls to slide freely past the reduced diameter end portion 94 of the worm shaft 53, yet held in position by the retaining bolt 95 and washer 96. The block 90, rearwardly of the slot 93, is provided with a recess 97 of sufficient size to permit the slight swinging, through a narrow angle, of a pin 98 seated in a radial socket 99 in the reduced diameter portion 94 of the worm shaft 53. Threaded through the block 90 into opposite sides of the recess 97 are adjusting screws 100. The inner ends of these screws engage the opposite sides of the pin 98 (Figure 2). As a consequence, when one of the screws 100 is tightened and the other is loosened, the pin 98 is swung, turning the worm shaft 53 through a slight angle to permit the small end of the pin 85 on the arm 87 to enter one of the holes 84, if it happens to be slightly out of line therewith. The screws 100 are provided with lock nuts 101 for securing them in any desired position of adjustment. The swinging of the arm 87 and the inserting of the end of the pin 85 into any particular hole, is facilitated by the provision of stop members 102 and 103 having disc-like overlying inner portions 104 and 105 respectively (Figure 4) which are held in frictional yielding engagement between the inner surface of the block 90 and the outer surface of the dial 83. The positions of the stop members 102 and 103 may be altered merely by pushing them with the fingers with sufficient force to overcome the friction holding them in their adjusted positions.

Figure 5:
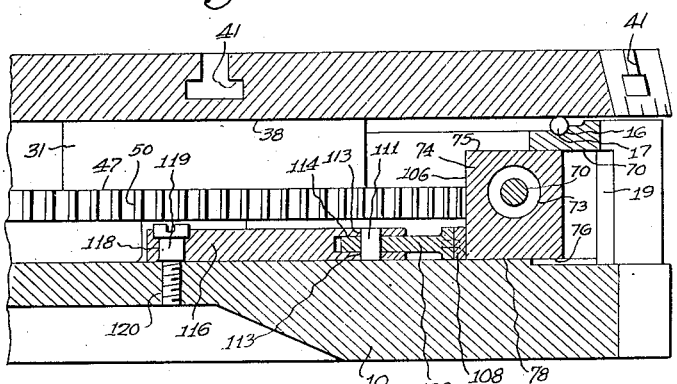
Figure 5 is a section along the line 5—5 in Figure 1 through the quick-engagement mechanism.

Secured to the side 106 of the block 74 as by the set screws 107 is a bar 108 to which an ear 109 is secured, as by the set screws 110 (Figures 1 and 5). The ear 109 carries a pin 111 engaging slots 112 having angled end notches 113. The ear 109 enters and engages the walls of a slot 114 (Figure 5) in the arm 115 of a bell crank lever 116, the slots 112 being formed in the arm 115. The other arm 117 of the bell crank lever 116 projects outwardly beyond the periphery of the turntable 36 so as to provide a handle. The bell crank lever 116 is provided with a pivot bore 118 for receiving the upper end of a pivot screw 119 threaded into a bore 120 in the base plate 10 (Figure 5). The handle 117 projects outwardly through an elongated passageway 121 in the cylindrical casing 14 (Figure 2).

The cylindrical casing 14 near its upper edge 15 is provided with an indexing pointer 122 (Figure 2) secured thereto as by the screws 123 engaging the slots 124. The periphery of the turntable 36 is beveled as at 125 and at its lower edge is provided with graduations 126 registering with the pointer 122.

In operation, the device is clamped to the bed of a machine tool, such as a milling machine, by bolts engaging the T-slots thereof and secured in the slots 12 of the recesses 11 in the base plate 10. The work piece, such as a die in which peripherally spaced slots are to be formed, is clamped to the upper surface 42 of the turntable 36 by means of bolts engaging the T-slots 40 and 41. The handle 117 is swung to the left (Figure 1) to swing the worm shaft 53 and worm 52 toward the worm wheel 47, so that the worm teeth 51 mesh with the worm wheel teeth 50. When this occurs, the pin 111 enters the angled locking notch 113. The stop arms 102 and 103 and the crank arm 87 are adjusted so that the pin 85 will enter a particular set of holes, the screws 100 being likewise adjusted, if necessary, in the manner previously described. The arm 87 and the work piece upon the turntable 36 are adjusted relatively to one another until the pointer 122 and the pin 85 in the holes 84 are in suitable starting position relatively to the cutter of the machine tool.

After the cut has been made, or a series of cuts at one station, with the aid of the indexing dial 83 and crank arm 87, the handle 117 (Figure 1) is swung to the right. This action swings the pin 111 out of the locking notch 113 into the slots 112. As the pin 113 is thus caused to travel along the slots 112, the ear 109 swings the block 74 to the right (Figure 1) disengaging the worm 52 from the worm wheel 47.

The previous setting of the turntable 36 having been noted, according to the reading of the pointer 122 on the graduations 126, the turntable 36 is then rotated manually to the next station at which the same cut or a series of cuts are to be made. With the worm 51 out of mesh with the worm wheel 47, the indexing arm 87 is returned to the hole 84 denoting its starting position. The handle 117 is then swung to the left, whereupon the motion of the slots 112 causes the pin 111 and the ear 109 to swing the lock 74 and worm shaft 53 to the left around the pivot shaft 60, causing the worm 52 to mesh with the worm wheel 47, whereupon the pin 111 comes to rest in the locking notches 113 (Figure 1). The cut, or series of cuts is now repeated, whereupon the turntable 36 is moved to a new station by repeating the foregoing procedure.

This invention is well adapted to quickly and accurately produce work pieces having sets of spaced recesses, slots, holes or the like at intervals around a work piece. An example of such a work piece is a die for use in stamping out laminations of electric motors and transformers. The use of this invention enables these to be produced quickly and accurately without the necessity of having to crank the indexing mechanism by hand all the way around from one station to another in order to locate the turntable 36 relatively to the cutter at each station. Danger of error is also eliminated since the indexing arm 87 is cranked only by a small amount at each station and not between stations. The invention is particularly advantageous in repeating sets of cuts which are spaced a long distance apart around the periphery of the work piece.

While I have shown and described my invention in detail, it is to be understood that the same is to be limited only by the appended claims, for many changes may be made without departing from the spirit and scope of my invention.

What I claim is:

1. An indexing device for machine tools, comprising a base, a work holding turntable rotatably mounted on said base and having work holder thereon, a worm gear mounted beneath said turntable and operatively connected thereto for rotation thereof, a worm movable into and out of mesh with said worm gear, indexing mechanism connected to said worm for applying to said turntable and measuring the motion imparted thereto by a predetermined motion of said worm, a worm mount pivotally mounted on said base, a lever pivotally mounted on said base, and pin-and-slot mechanism responsive to the swinging of said lever for swinging said worm mount into a position wherein said worm meshes with said worm gear.

2. An indexing device for machine tools, comprising a base, a work holding turntable rotatably mounted on said base and having work holder thereon, a worm gear mounted beneath said turntable and operatively connected thereto for rotation thereof, a worm movable into and out of mesh with said worm gear, indexing mechanism connected to said worm for applying to said turntable and measuring the motion imparted thereto by a predetermined motion of said worm, a worm mount pivotally mounted on said base, a lever pivotally mounted on said base, and pin-and-slot mechanism responsive to the swinging of said lever for swinging said worm mount into a position wherein said worm meshes with said worm gear, said pin-and-slot mechanism including a locking slot connected thereto and operable to releasably lock said pin therein whereby to releasably lock said worm in mesh with said worm gear.

FERDINAND J. HENKEL.

REFERENCES CITED

The following references are of record in the file of this patent:

UNITED STATES PATENTS

| Number | Name | Date |
|---|---|---|
| 531,817 | Warren | Jan. 1, 1895 |
| 1,100,522 | Brown et al. | June 16, 1914 |
| 1,737,002 | De Vlieg | Nov. 26, 1929 |
| 1,868,016 | Marsilius et al. | July 16, 1932 |
| 1,946,835 | Buhr | Feb. 13, 1934 |
| 2,059,753 | Scott et al. | Nov. 3, 1936 |

FOREIGN PATENTS

| Number | Country | Date |
|---|---|---|
| 128,473 | Great Britain | June 26, 1919 |
| 237,698 | Germany | Aug. 30, 1911 |